United States Patent
Hinata et al.

(10) Patent No.: US 7,564,521 B2
(45) Date of Patent: Jul. 21, 2009

(54) TRANSFLECTIVE LIQUID CRYSTAL DISPLAY DEVICE HAVING A MONOCHROME REFLECTION MODE AND FULL COLOR TRANSMISSION MODE

(75) Inventors: Shoji Hinata, Nagano (JP); Takeshi Kurashima, Nagano (JP)

(73) Assignee: Seiko Epson Corporation (JP)

( * ) Notice: Subject to any disclaimer, the term of this patent is extended or adjusted under 35 U.S.C. 154(b) by 363 days.

(21) Appl. No.: 11/143,189

(22) Filed: Jun. 2, 2005

(65) Prior Publication Data
US 2005/0275775 A1    Dec. 15, 2005

(30) Foreign Application Priority Data
Jun. 15, 2004    (JP)    ............... 2004-176762

(51) Int. Cl.
*G02F 1/1335* (2006.01)
*G02F 1/1333* (2006.01)

(52) U.S. Cl. ............... 349/114; 349/106; 349/158; 349/160

(58) Field of Classification Search ............... 349/106, 349/114, 158, 160
See application file for complete search history.

(56) References Cited

U.S. PATENT DOCUMENTS

| | | | | |
|---|---|---|---|---|
| 5,796,451 | A * | 8/1998 | Kim | 349/66 |
| 6,768,533 | B2 * | 7/2004 | Hanakawa et al. | 349/153 |
| 6,787,275 | B2 * | 9/2004 | Kawase | 430/7 |
| 2001/0020990 | A1 * | 9/2001 | Moon | 349/96 |
| 2002/0008681 | A1 * | 1/2002 | Hanakawa et al. | 345/87 |
| 2002/0044241 | A1 * | 4/2002 | Matsuo | 349/113 |
| 2003/0076609 | A1 * | 4/2003 | Kawase | 359/885 |
| 2004/0056999 | A1 * | 3/2004 | Ko et al. | 349/114 |
| 2005/0057711 | A1 * | 3/2005 | Chang et al. | 349/114 |
| 2005/0190315 | A1 * | 9/2005 | Asuma et al. | 349/44 |
| 2005/0275775 | A1 * | 12/2005 | Hinata et al. | 349/114 |

(Continued)

FOREIGN PATENT DOCUMENTS

JP    11-337931    12/1999

(Continued)

OTHER PUBLICATIONS

Communication from Taiwan Patent Office regarding related application.

(Continued)

*Primary Examiner*—Andrew Schechter
*Assistant Examiner*—Jessica M Merlin
(74) *Attorney, Agent, or Firm*—Harness, Dickey & Pierce, P.L.C.

(57) ABSTRACT

A liquid crystal display device includes a liquid crystal panel including liquid crystal interposed between a pair of substrates facing each other and pixels, each pixel having a plurality of subpixels corresponding to different colors, an illumination device that is provided at one side of the liquid crystal panel to irradiate illumination light onto the liquid crystal panel, a color filter that is provided on one substrate of the pair of substrates where the illumination device is provided and in which a plurality of colored layers for different colors corresponding to the subpixels are arranged, a reflecting film that is provided at the liquid crystal side with respect to the color filter, and transmissive portions that overlap the colored layers to transmit illumination light.

7 Claims, 6 Drawing Sheets

U.S. PATENT DOCUMENTS

2006/0044493 A1* 3/2006 Fredley et al. ............. 349/114
2006/0050207 A1  3/2006 Igarashi et al.

FOREIGN PATENT DOCUMENTS

| JP | 2000-298271 | 10/2000 |
| JP | 2001-108980 | 4/2001 |
| JP | 2001108980 A * | 4/2001 |
| JP | 2001-201738 | 7/2001 |
| JP | 2001-242452 | 9/2001 |
| JP | 2003-172924 | 6/2003 |
| JP | 2003-177232 | 6/2003 |
| JP | 2003-222851 | 8/2003 |
| JP | 2003222851 A * | 8/2003 |
| JP | 2005-308989 | 11/2005 |
| WO | WO 2004/046801 | 6/2004 |

OTHER PUBLICATIONS

Communication from Japanese Patent Office regarding counterpart application.

* cited by examiner

TRANSFLECTIVE LIQUID CRYSTAL DISPLAY DEVICE HAVING A MONOCHROME REFLECTION MODE AND FULL COLOR TRANSMISSION MODE

RELATED APPLICATIONS

This application claims priority to Japanese Patent Application No. 2004-176762 filed Jun. 15, 2004 which is hereby expressly incorporated by reference herein in its entirety.

BACKGROUND OF THE INVENTION

1. Technical Field

The present invention relates to a transflective liquid crystal display device, which has a reflective mode and a transmissive mode, and an electronic apparatus. More specifically, it relates to a structure of a so-called mono/color liquid crystal display device in which the reflective mode is operated for black-and-white display and the transmissive mode is operated for color display.

2. Related Art

In recent years, as display devices for cellular phones or PDAs, transflective liquid crystal display devices which have a reflective mode and a transmissive mode are widely used. In such transflective liquid crystal display devices, a reflecting film made of a metal film such as aluminum or the like and having a slit (opening portion) therein for light transmission is provided on an inner surface of a lower substrate, such that the reflecting film serves as a transflective film. In this case, in the reflective mode, external light incident from an upper substrate is reflected at the reflecting film disposed on the inner surface of the lower substrate after passing through a liquid crystal layer, passes back through the liquid crystal layer, and is emitted from the upper substrate for display. On the other hand, in the transmissive mode, light from a backlight incident from the lower substrate passes through the liquid crystal layer through the opening portion of the reflecting film and is emitted from the upper substrate to the outside for display. Therefore, the region of the reflecting film with the opening portion is a transmissive display region and the other region is a reflective display region (see Japanese Unexamined Patent Application Publication No. 2003-172924).

In a widely used transflective liquid crystal display device, a color filter is provided on any one of the upper substrate and the lower substrate. For example, in Japanese Unexamined Patent Application Publication No. 2003-172924, a transflective liquid crystal display device in which the reflecting film and the color filter are sequentially laminated on the inner surface of the lower substrate, and the reflective mode and the transmissive mode are operated for color display is disclosed. However, according to the use, the reflective mode may be operated for black-and-white display, not for the color display, for the sake of brightness. Accordingly, the inventors have proposed a liquid crystal display device in which a color filter is provided on only the transmissive display region (the opening portion of the reflecting film), earlier than the present invention. Hereinafter, such a transflective liquid crystal display device is referred to as a mono/color liquid crystal display device.

Figure 9A:
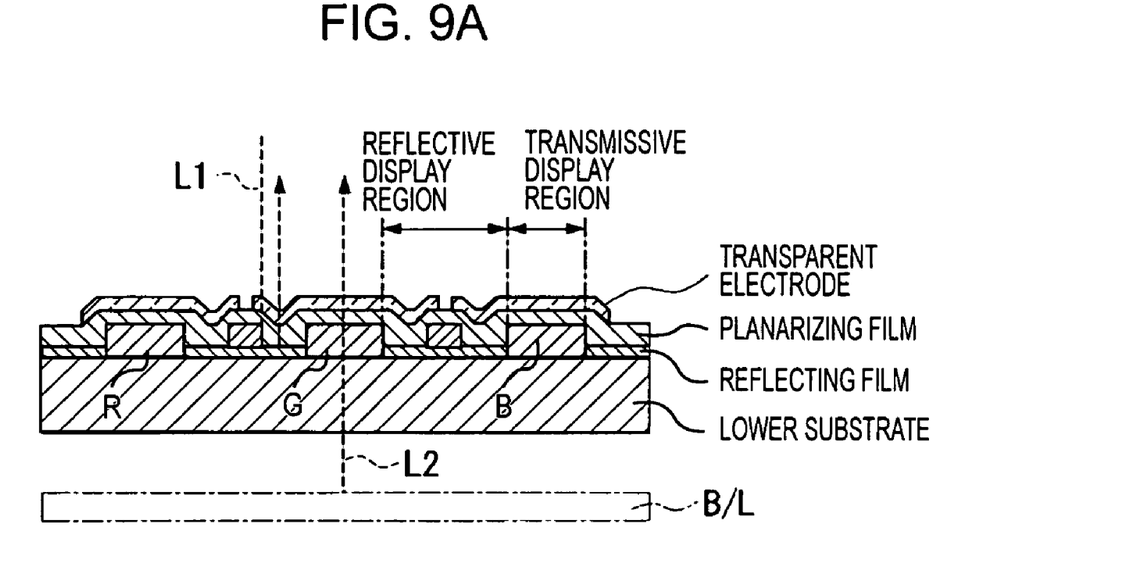
FIG. 9A is a cross-sectional view schematically showing a mono/color liquid crystal display device according to a related art.
Figure 9B:
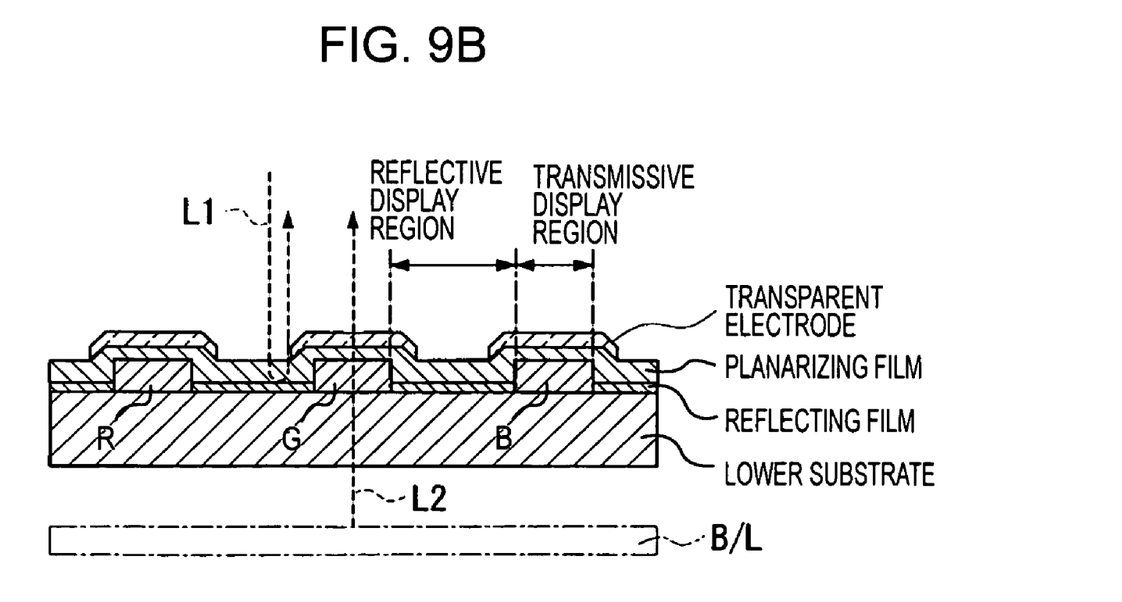
FIG. 9B is a cross-sectional view schematically showing a mono/color liquid crystal display device according to a related art.

FIG. 9B is a schematic view showing a cross-sectional structure of the lower substrate of the mono/color liquid crystal display device proposed previously. In the liquid crystal display device, a reflecting film, the color filters (colored layers) R, G, and B, a planarizing film, and a transparent electrode are sequentially laminated on the lower substrate. In the reflecting film, the opening portion is provided at a central portion of each pixel. The region with the opening portion (transmissive portion) is the transmissive display region and the other region is the reflective display region. The colored layers R, G, and B are selectively formed in only the opening portions of the reflecting film serving as the transmissive display regions.

In the transflective liquid crystal display device, in order to obtain brightness at the time of the reflective display, the reflective display region is formed wider than the transmissive display region. In the mono/color liquid crystal display device, the reflective display region is widened and thus the occupied area ratios of the colored layers R, G, and B on the substrate become small. In a plan view, the intervals of the adjacent colored layers R, G, and B become extremely large as compared to the sizes of the colored layers R, G, and B. For this reason, when the colored layers R, G, and B are formed thicker for the purpose of increasing color purity, unevenness due to the colored layers is not sufficiently planarized by the planarizing film, which results in gap irregularity. In particular, when gap control needs to be performed with high precision, as in a STN-type liquid crystal display device or the like, such gap irregularity causes the display quality to be significantly degraded. In order to solve these problems, the inventors have proposed a structure in which a black matrix BM is arranged on a portion of a region where the colored layer is not formed, as shown in FIG. 9A. In this case, since a space between the colored layers is partially covered with the black matrix BM, planarization of the substrate surface is enhanced as compared to the above-described structure. In this structure, however, since the black matrix BM is formed in the reflective display region, the reflective display darkens. Further, in the above-described structures, if a positional deviation occurs between the opening pattern of the reflecting film and the pattern of the colored layer, reflective luminance and transmissive luminance are degraded. Accordingly, there is a problem in that the formation of the pattern needs to be performed with high precision.

SUMMARY

An advantage of the invention is that it provides a mono/color liquid crystal display device which can perform vivid color display in a transmissive mode and bright monochrome display in a reflective mode, which has favorable gap uniformity, and which can be easily manufactured, and an electronic apparatus.

According to an aspect of the invention, a liquid crystal display device includes a liquid crystal panel including liquid crystal interposed between a pair of substrates facing each other and pixels, each pixel having a plurality of subpixels corresponding to different colors, an illumination device that is provided at one side of the liquid crystal panel to irradiate illumination light onto the liquid crystal panel, a color filter that is provided on one substrate of the pair of substrates where the illumination device is provided and in which a plurality of colored layers for different colors corresponding to the subpixels are arranged, a reflecting film that is provided at the liquid crystal side with respect to the color filter, and transmissive portions that overlap the colored layers to transmit illumination light.

As described above, in the mono/color liquid crystal display device according to the related art, the reflecting film is arranged below the color filter (at the illumination device side). Accordingly, in order to realize the mono/color structure, the color filter needs to be accurately patterned to correspond to only the transmissive portion of the reflecting film. Further, in order to increase gap uniformity, the film thickness of the color filter is limited so as not to exceed the degree of planarization by the planarizing film, such that a sufficient color gamut is not obtained. On the contrary, according to the aspect of the invention, unlike arrangement relationship of the reflecting film and the color filter in the related art, the reflecting film is provided above the color filter (viewing side) such that the reflecting film is arranged to partially overlap the respective colored layers of the color filter in a plan view. In this case, the colored layer disposed on the reflective display region is covered with the reflecting film, and thus the colored layer does not influence on the reflective display. For this reason, a bright reflective display can be performed. Further, in this case, since the colored layer does not need to be accurately patterned to align with the transmissive display region, a typical color filter, that is, a color filter in which colored layers or black matrixes are substantially arranged with no intervals and which has a planarized surface can be used as the color filter. Therefore, as compared to the related art, a mono/color liquid crystal display device having favorable gap uniformity can be provided. Further, the size of the positional deviation of the color filter and the reflecting film is tolerable up to the size of the transmissive portion of the reflecting film, and thus a manufacturing process can be simplified.

In accordance with the aspect of the invention, it is preferable that the color filter and the reflecting film are sequentially laminated on a surface (inner surface) facing the liquid crystal of the one substrate (lower substrate) of the pair of the substrates of the liquid crystal panel where the illumination device is provided.

As such, since the color filter is provided on the inner surface of the one substrate, an influence by color mixing due to the thickness of the lower substrate can be prevented.

Further, in accordance with the aspect of the invention, it is preferable that the reflecting film is provided on a surface (inner surface) facing the liquid crystal of the one substrate (lower substrate) of the pair of substrates of the liquid crystal panel where the illumination device is provided, and the color filter is provided on a surface (outer surface) opposite to the liquid crystal of the one substrate where the illumination device is provided.

In this case, the color filter can be externally attached, and thus a yield can be enhanced. However, in this case, since color mixing between adjacent subpixels is likely to be generated due to the thickness of the lower substrate, it is preferable to devise any unit for preventing color mixing. Specifically, a configuration in which a concave portion is formed on the surface opposite to the liquid crystal of the one substrate and the color filter is provided in the concave portion may be adopted. In this case, only a portion where the color filter is arranged is partially thinned, the strength of the substrate can be ensured as compared to the case in which the overall substrate is thinned. For example, when the lower substrate is brought down from mother glass, cracks or the like are not generated.

Further, in accordance with the aspect of the invention, it is preferable that the reflecting film has a light-scattering function.

As such, the display can be performed with a wide viewing angle.

Further, in accordance with the aspect of the invention, it is preferable that the reflecting film is arranged to overlap a joint portion of adjacent colored layers.

As such, color mixing between the colored layers can be prevented.

In accordance with the aspect of the invention, it is preferable that a light-shielding layer is provided between the colored layers, and the region where the reflecting film is not formed overlaps a portion of the light-shielding layer.

In this case, the portion of the reflecting film that covers the light-shielding layer is removed to expose the light-shielding layer, and thus the light-shielding layer can be formed at a predetermined size according to process precision of the reflecting film. For example, when black resin is used for the light-shielding layer, black resin has process precision of no more than 13 µm, such that black resin is not suitable for uses with high definition. In accordance with the aspect of the invention, however, the reflecting film is formed on the light-shielding layer and the portion of the light-shielding layer is exposed by photo etching. Therefore, the light-shielding layer can be formed with precision (precision of several µm) at the time of photo etching of the reflecting film.

According to another aspect of the invention, there is provided an electronic apparatus having the above-described liquid crystal display device.

As such, an electronic apparatus having a display unit which can perform a vivid color display in the transmissive mode and a bright monochrome display in the reflective mode can be provided.

BRIEF DESCRIPTION OF THE DRAWINGS

The invention will be described with reference to the accompanying drawings, wherein like numbers reference like elements, and wherein.

DESCRIPTION OF THE EMBODIMENTS

Hereinafter, an embodiment of the invention will be described with reference to the drawings. Moreover, the film thickness, the ratio of the size, and the like of each element in the drawings are properly adjusted in order to be recognizable in the drawings. Further, in the specification, a surface facing liquid crystal of each of the elements constituting a liquid crystal display device is referred to as 'an inner surface' and a surface opposite to the liquid crystal is referred to as 'an outer surface'.

Figure 1A:
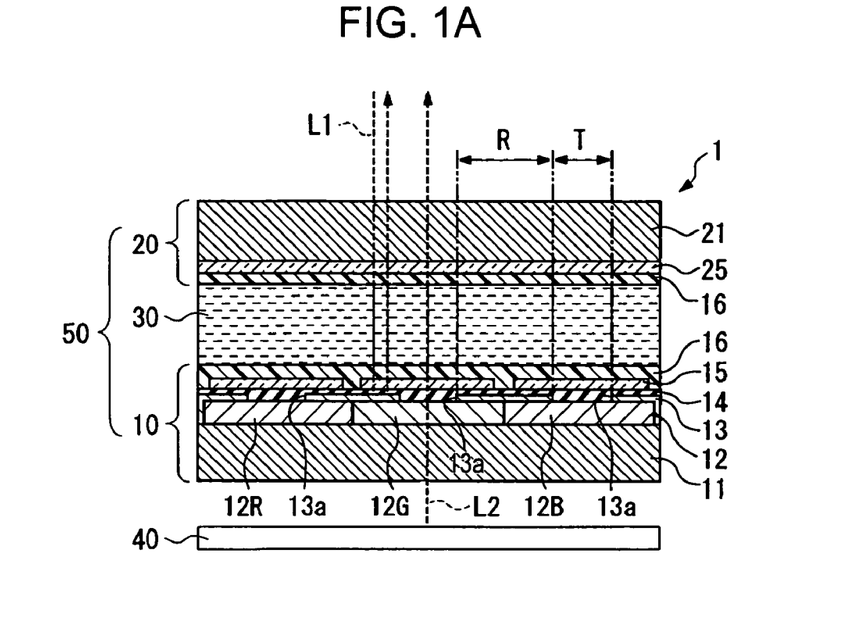
FIG. 1A is a cross-sectional view schematically showing a liquid crystal display device according to an embodiment of the invention.
Figure 1B:
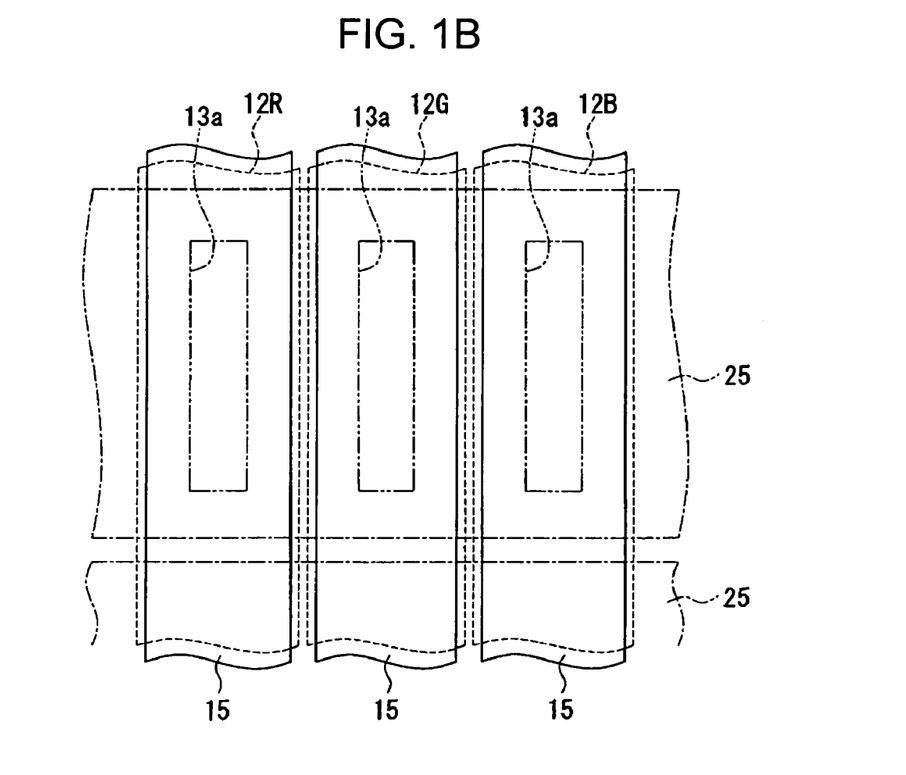
FIG. 1B is a plan view schematically showing a liquid crystal display device according to the embodiment of the invention.

FIGS. 1A and 1B are schematic views showing a configuration of a liquid crystal display device according to the invention. Specifically, FIG. 1A is a diagram showing a cross-sectional structure of one pixel having three R, G, and B subpixels and FIG. 1B is a diagram showing a planar structure thereof. A liquid crystal display device 1 has a liquid crystal panel 50 that has a plurality of subpixels in one pixel and a backlight (an illumination device) 40 that is arranged opposite to a viewing side (an upper side of the paper) with respect to the liquid crystal panel 30.

The liquid crystal panel 50 is formed by bonding a lower substrate 10 and an upper substrate 20 with STN liquid crystal 30 interposed therebetween by means of ring-shaped sealing members (not shown) disposed at peripheral portions of the two substrates. On an inner surface of a substrate main body 11 made of glass or plastic of the lower substrate 10, a color filter 12 having a plurality of colored layers is formed. In the color filter 12, three types of colored layers 12R, 12G, and 12B corresponding to three primary colors of R, G, and B are arranged in stripe shapes at predetermined intervals to correspond to the arrangement of the subpixels.

On a surface of the color filter 12, a reflecting film 13 made of a metal film having high reflection, such as aluminum or silver, is partially formed to partially overlap the respective colored layers 12R, 12G, and 12B in plan view. That is, the reflecting film 13 of the present embodiment is provided with opening portions 13a. A region where the reflecting film 13 is formed is a reflective display region R and a region where the reflecting film 13 is not formed, that is, a region with the opening portion (transmissive portion) 13a, is a transmissive display region T. The opening portion 13a is provided for each subpixel and allows both transmissive display and reflective display in each subpixel. Further, in the present embodiment, the opening portion 13a is formed at a central portion of each subpixel and the reflecting film 13 is arranged at a region including a boundary portion of the subpixels (that is, a joint portion of adjacent colored layers). For this reason, the reflecting film 13 at the boundary portion serves as a black matrix, thereby preventing color mixing between the colored layers. As such, in the present embodiment, the reflecting film 13 is provided with the opening portions 13a and thus the reflecting film 13 serves as a transflective film. For example, the reflecting film 13 can be formed by film-forming and etching aluminum or the like after the color filter 12 is formed on the lower substrate 10. At this time, the colored layers of the color filter 12 are arranged with as small a gap as possible, and the surface of the color filter 12 is preferably planarized. Alternatively, the reflecting film 13 may be patterned on a commercially available color filter substrate.

An insulating film 14 is formed on a surface of the reflecting film 13 and a plurality of transparent electrodes 15 made of ITO or the like are formed on a surface of the insulating film 14. The transparent electrodes 15 are formed in stripe shapes in plan view to extend in the vertical direction in the drawing. The transparent electrodes 15 extend in a direction orthogonal to transparent electrodes 25 in stripe shapes, which are formed on the upper substrate 20. Some of the elements of the liquid crystal panel 50 at each of the intersections of the transparent electrodes 15 and the transparent electrodes 25 (portions of the color filter 12, the reflecting film 13, the transparent electrode 15, the liquid crystal 30, the transparent electrode 25, and the like within the intersection) constitutes one pixel. Then, on an uppermost surface of the lower substrate 10 constructed in such a manner, an alignment film 16 made of polyimide or the like is formed.

On the other hand, on the upper substrate 20, on an inner surface of a substrate main body 21 made of glass, plastic or the like, a plurality of transparent electrodes 25 made of ITO or the like, and an alignment film 16 made of polyimide or the like are formed sequentially. The transparent electrodes 25 are formed in stripe shapes in plan view to extend in a direction orthogonal to the transparent electrodes 15 of the lower substrate 10, that is, in the horizontal direction in the drawing.

In the liquid crystal display device 1, in the reflective display, external light L1 incident from the upper substrate 20 is reflected by the reflecting film 13 after passing through the liquid crystal 30, passes back through the liquid crystal 30 and the upper substrate 20, and is emitted to the outside. Since light L1 does not pass through the color filter 12, black-and-white display is performed. On the other hand, in the transmissive display, light L2 from the backlight 40 incident from the lower substrate is incident on the liquid crystal 30 through the opening portion 13a of the reflecting film 13 after passing through the color filter 12. Subsequently, light L2 is emitted to the outside after passing through the liquid crystal 30 and the upper substrate 20. Since light L2 passes through the color filter 12, color display is performed.

As such, the liquid crystal display device 1 of the present embodiment is a transflective liquid crystal display device which has a reflective mode using external light and a transmissive mode using an internal light source. In particular, the liquid crystal display device 1 is a mono/color liquid crystal display device in which the reflective mode is operated for black-and-white display and the transmissive mode is operated for color display. The liquid crystal display device of the present embodiment has a feature in that the arrangement relationship of the color filter and the reflecting film is inverted, as compared to the liquid crystal display device according to the related art. As described above, in the liquid crystal display device according to the related art, since the reflecting film is arranged below the color filter (at the illumination device side), in order to realize the mono/color structure, the color filter needs to be accurately patterned only in the transmissive portion of the reflecting film. Further, in order to increase the gap uniformity, the film thickness of the color filter is limited so as not to exceed the degree of planarization by the planarizing film. Accordingly, there is a case in which a sufficient color gamut is not obtained. On the contrary, in the present embodiment, unlike the arrangement relationship of the reflecting film and the color filter in the related art, the reflecting film 13 is provided on the color filter 12 (the viewing side) such that the reflecting film 13 is arranged to partially overlap the respective colored layers 12R, 12G, and 12B of the color filter 12 in plan view. In this configuration, the colored layers 12R, 12G, and 12B disposed in the reflective display region R are covered with the reflecting film 13, such that the colored layers 12R, 12G, and 12B do not influence the reflective display. For this reason, bright reflective display can be performed. Further, in this configuration, the colored layers 12R, 12G, and 12B do not need to be patterned to align with the transmissive display region T, and thus a typical color filter, that is, a color filter in which the colored layers 12R, 12G, and 12B are arranged with no intervals and which has a planarized surface, can be used as the color filter 12. Therefore, as compared to the related art, a mono/color liquid crystal display device having favorable gap uniformity can be provided. Further, the size of the positional deviation between the color filter 12 and the reflecting film 13 is tolerable up to the size of the transmissive portion 13a of the reflecting film 13. As a result, a manufacturing process can be simplified.

Modifications

Next, modifications of the embodiment will be described. Moreover, in the following modifications, the same elements or portions as those in the embodiment are represented by the same reference numerals and the detailed descriptions thereof will be omitted.

First Modification

Figure 2:
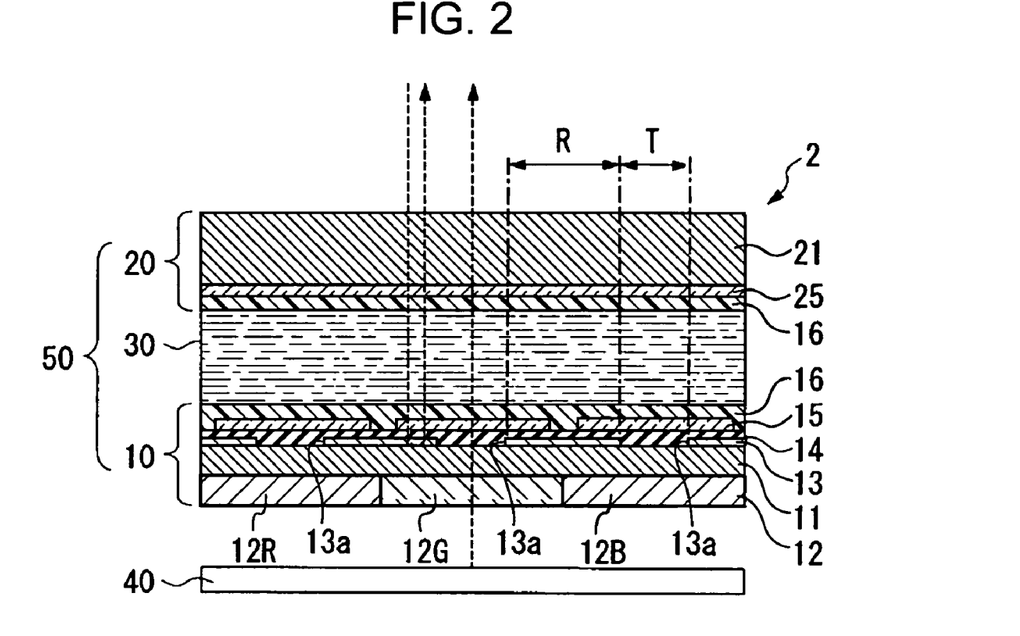
FIG. 2 is a cross-sectional view schematically showing a configuration of a liquid crystal display device according to a first modification.

FIG. 2 shows an example in which a color filter 12 is arranged on an outer surface of the lower substrate 10. In a liquid crystal display device 2 having such a configuration, the same advantages as those described above can be obtained. Further, in this configuration, since the color filter 12 can be externally attached, a yield can be advanced. However, when the lower substrate 10 is thick, color mixing between the subpixels is likely to be generated due to the thickness. Therefore, the thickness of the lower substrate 10 is preferably equal to or less then 0.1 mm.

Second Modification

Figure 3:
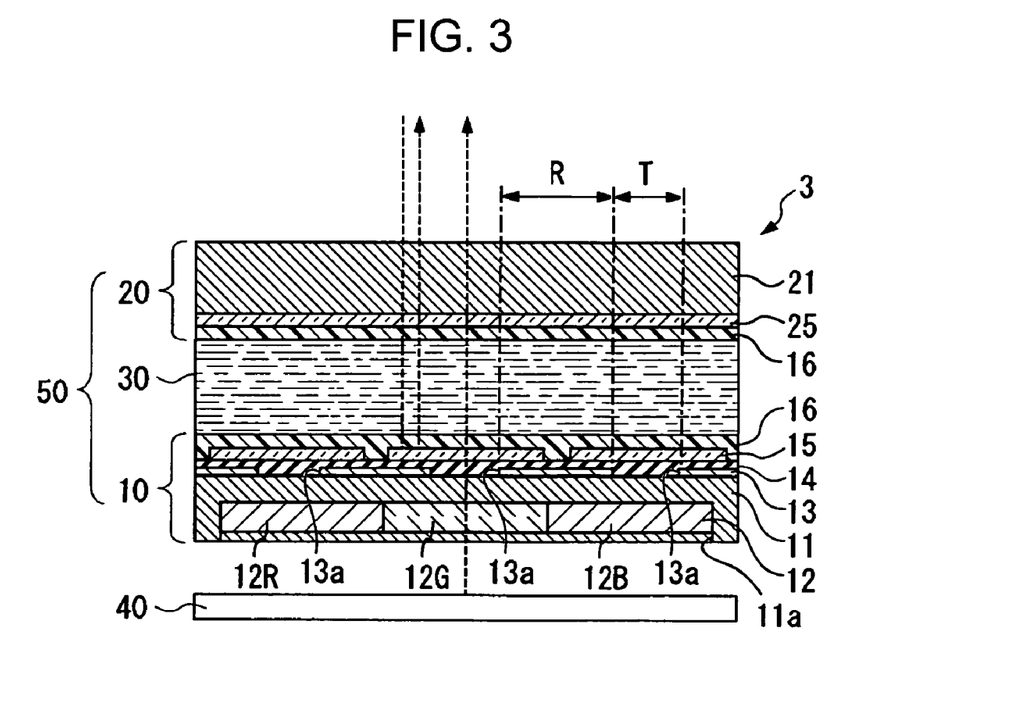
FIG. 3 is a cross-sectional view schematically showing a configuration of a liquid crystal display device according to a second modification.

FIG. 3 shows an example in which a concave portion 11a for thinning the thickness of the substrate is formed on an outer surface of the lower substrate 10 and a color filter 12 is provided in the concave portion 11a. In a liquid crystal display device 3, since only a portion where the color filter 12 is arranged is partially thinned, the strength of the substrate 11 can be ensured, as compared to the case in which the overall substrate is thinned, as shown in FIG. 2. For example, when the substrate 11 is brought down from mother glass, cracks or the like hardly occur.

Third Modification

Figure 4:
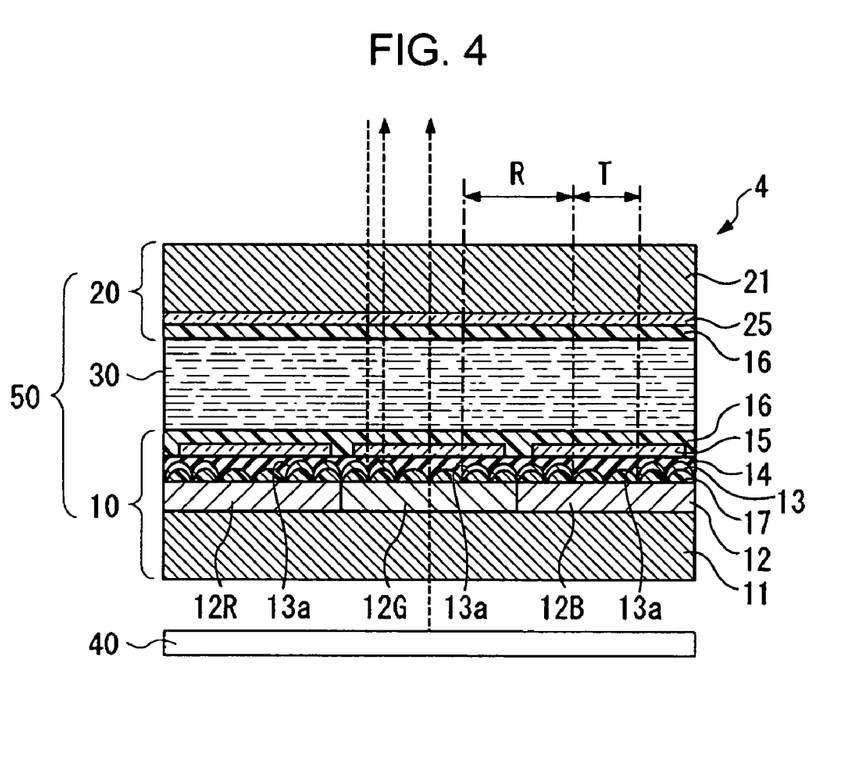
FIG. 4 is a cross-sectional view schematically showing a configuration of a liquid crystal display device according to a third modification.

FIG. 4 shows an example in which an uneven surface is formed below the reflecting film 13. In FIG. 4, a resin film 17 having an irregularly uneven shape is formed on a surface of the color filter 12 and the reflecting film 13 is formed on a surface of the resin film 17. Accordingly, a surface of the reflecting film 13 has an uneven shape according to the uneven shape of the resin film 17. In a liquid crystal display device 4, the reflecting film 13 has a light-scattering function, such that a display can be performed with a wide viewing angle.

Fourth Modification

Figure 5:
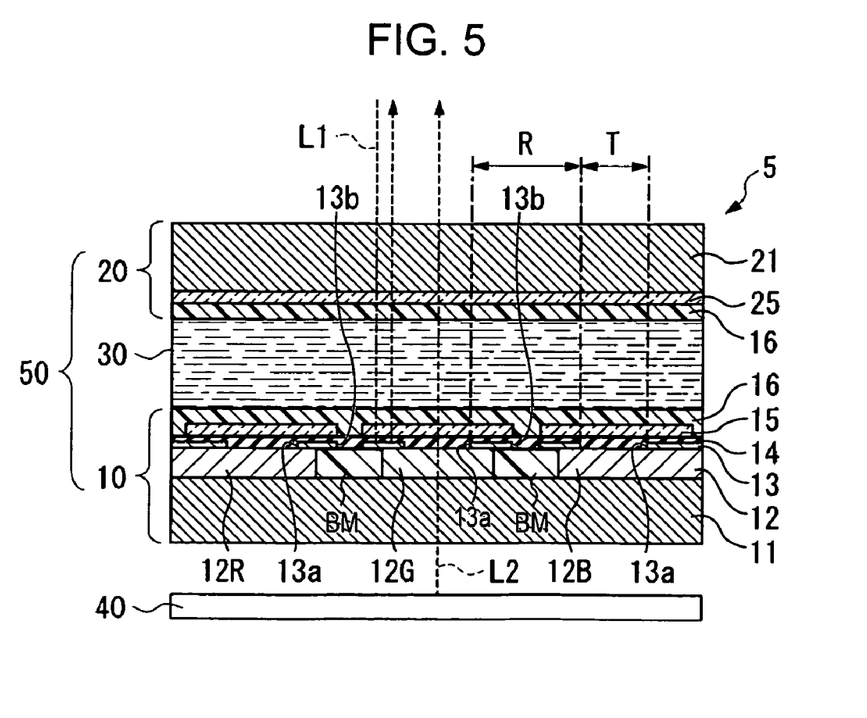
FIG. 5 is a cross-sectional view schematically showing a configuration of a liquid crystal display device according to a fourth modification.

FIG. 5 shows an example in which a light-shielding layer BM made of black resin is provided between adjacent colored layers and a portion of the reflecting film 13 over a surface of the light-shielding layer BM is removed by a photolithography technique (that is, a region where the reflecting film 13 is not formed is partially provided in a planar region of the light-shielding layer BM). While the color filter using black resin is inexpensive, process precision of black resin is no more than 13 μm, such that it is not suitable for uses with high definition. On the other hand, in a liquid crystal display device 5 of the present example, the reflecting film 12 is formed on the light-shielding layer BM and a portion of the light-shielding layer BM is exposed by photo etching. Accordingly, the light-shielding layer BM can be formed with precision (precision of several μm) at the time of photo etching of the reflecting film. That is, according to the liquid crystal display device 5 of the present example, a low-cost and high definition panel can be implemented.

Fifth Modification

Figure 6:
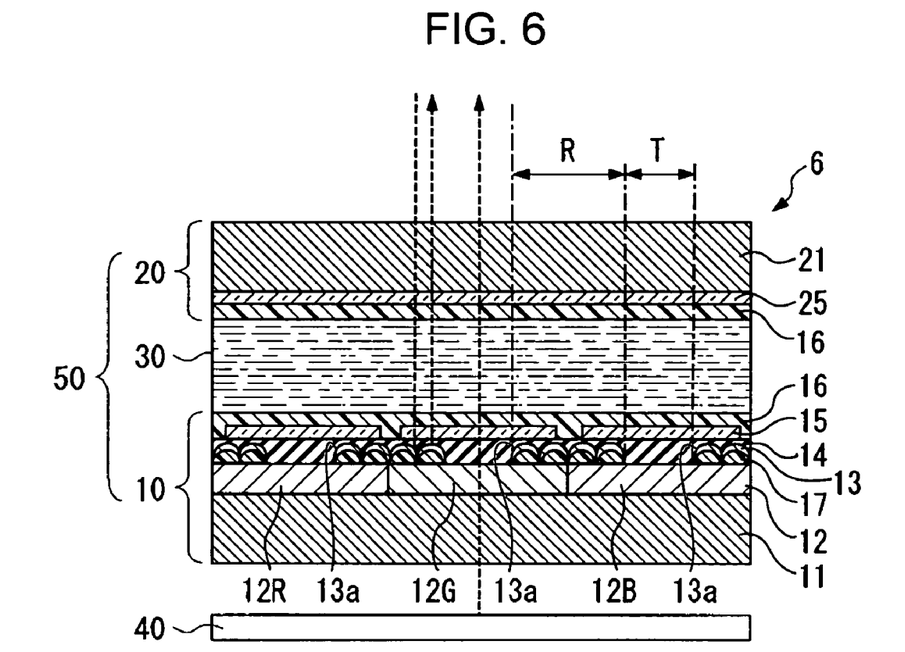
FIG. 6 is a cross-sectional view schematically showing a configuration of a liquid crystal display device according to a fifth modification.

FIG. 6 shows an example in which the resin film 17 of the transmissive display region T in the third modification shown in FIG. 4 is removed. According to a liquid crystal display device 6, contrast can be enhanced and the area of a color gamut can be enhanced.

Sixth Modification

Figure 7:
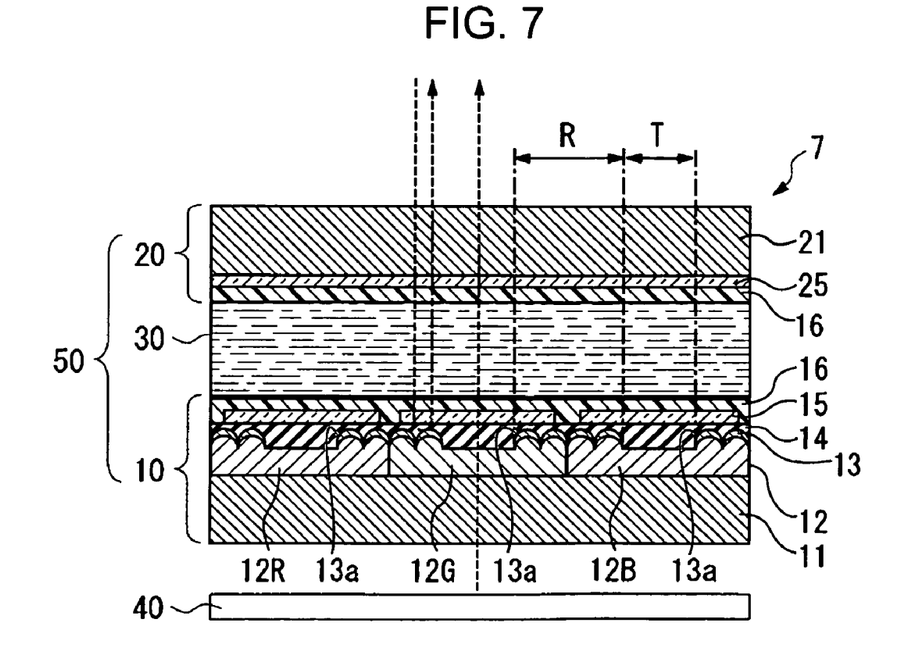
FIG. 7 is a cross-sectional view schematically showing a configuration of a liquid crystal display device according to a sixth modification.

FIG. 7 shows an example in which the resin film 17 is omitted and the colored layers 12R, 12G, and 12B themselves have irregular unevenness in the fifth modification shown in FIG. 6. That is, in the present example, the reflecting film 13 is formed on the surface of the color filter 12 having an uneven shape, such that the surface of the reflecting film 13 has an uneven shape according to the uneven shape of the colored layer. Accordingly, according to a liquid crystal display device 7 of the present example, a display can be performed with a wide viewing angle.

Electronic Apparatus

Figure 8:
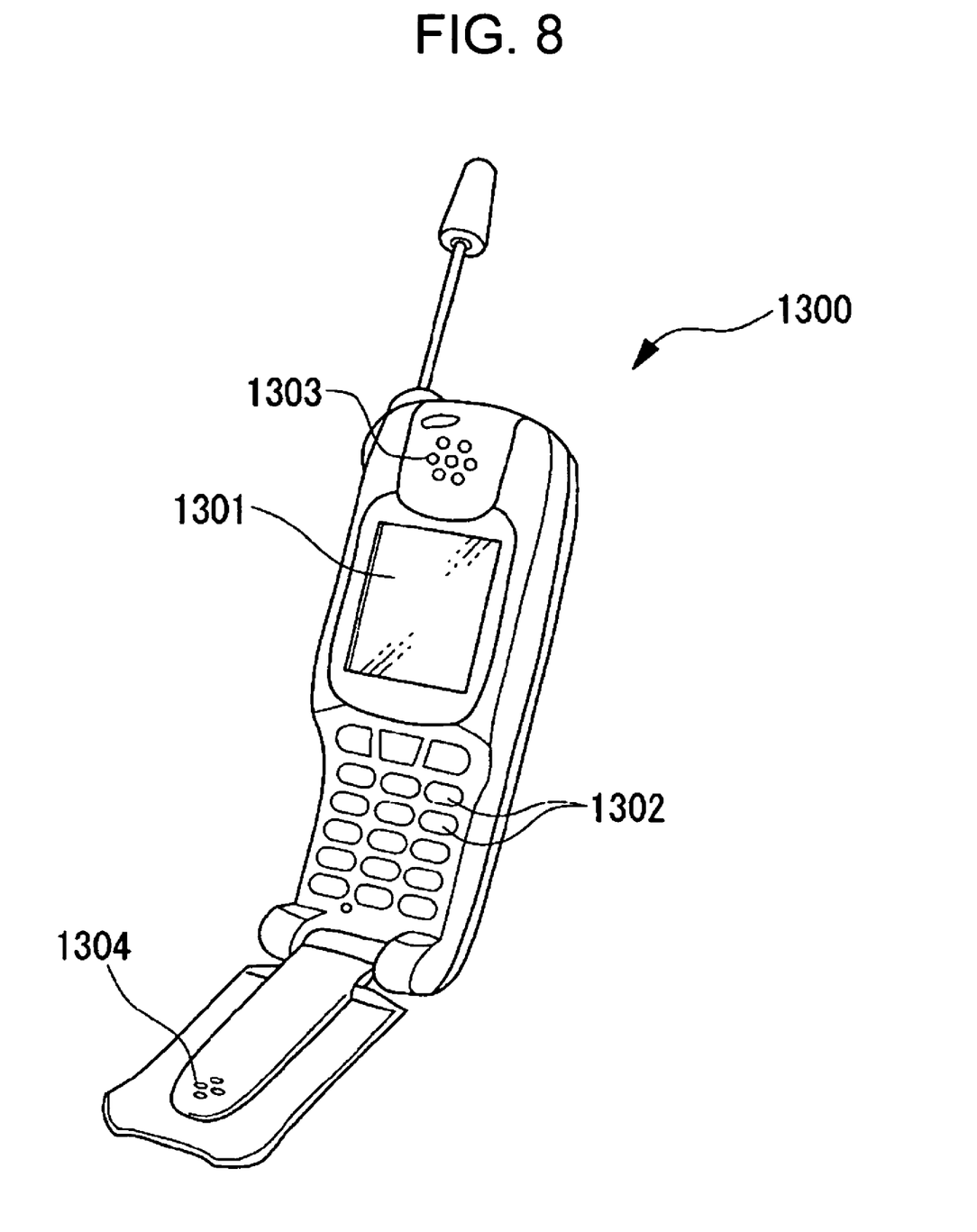
FIG. 8 is a perspective view showing an example of an electronic apparatus of the invention.

Next, an electronic apparatus of the invention will be described. FIG. 8 is a perspective view showing a cellular phone which is an example of an electronic apparatus according to the invention. A cellular phone 1300 has the liquid crystal display device of the invention as a small display unit 1301, a plurality of operating buttons 1302, a receiver 1303, and a transmitter 1304. Since the electronic apparatus has the liquid crystal display device of the invention, a vivid color display can be performed in the transmissive mode and a bright monochrome display can be performed in the reflective mode.

Moreover, the display devices of the embodiments are suitably used as an image display unit not only in the above-described cellular phone, but also in an electronic book, a personal computer, a digital still camera, a liquid crystal television, a viewfinder-type or monitor-direct-view-type video tape recorder, a car navigation device, a pager, an electronic organizer, an electronic calculator, a word processor, a workstation, a video phone, a POS terminal, an apparatus having a touch panel, or the like. In any of the electronic apparatuses, bright, high-contrast transmissive/reflective display can be performed with a wide viewing angle.

As described above, the preferred embodiments according to the invention were described with reference to the accompanying drawings. However, it is needless to say that the invention is not limited to the embodiments. Further, the shapes of the elements or the combination thereof shown in the above-described embodiments are examples. Various modifications can be made within a scope without departing from the spirit of the invention. In accordance with the embodiment of the invention, at least the reflecting film may be arranged near the liquid crystal layer, not the color filter. Other elements can be arbitrarily configured. For example, the color filter may be provided separately with respect to the lower substrate or the reflecting film and the color filter may be separated from the lower substrate. Further, in the above-described embodiments, the example in which the invention is applied to the STN liquid crystal display device is described. In addition, the invention can be applied to other types of liquid crystal display devices.

What is claimed is:

1. A liquid crystal display device comprising:
   an illumination device that outputs illumination light; and
   a liquid crystal panel that receives the illumination light from the illumination device, the liquid crystal panel including:
   a first substrate;
   a second substrate disposed in between the first substrate and the illumination device;
   liquid crystal interposed between the first and second substrates;

a pixel having subpixels corresponding to different colors, each sub-pixel including a reflective portion and a transmissive portion;

a first color filter corresponding to one of the subpixels, the first color filter being disposed between the liquid crystal and the second substrate;

a second color filter corresponding to another one of the subpixels, the second color filter being disposed between the liquid crystal and the second substrate at a position adjacent to the first color filter; and a first reflecting film provided in between the liquid crystal and the first color filter;

a second reflecting film provided in between the liquid crystal and the second color filter, the second reflecting film being separated from the first reflecting film by a gap; and a light-shielding layer provided between the first and second color filters at a position that overlaps the gap between the first and second color filters at a position that overlaps the gap between the first and second reflective films, the light-shielding layer having a broader width than the gap between the first and second reflective layers, wherein no color filter is disposed between the first substrate and the first reflecting film or the second reflecting film and the first and second reflecting films directly contact the light-shielding film.

2. The liquid crystal display device according to claim 1, wherein the reflecting film is laminated directly on the first and second color filters.

3. The liquid crystal display device according to claim 1, wherein the reflecting film has a light-scattering function.

4. The liquid crystal display device according to claim 1, wherein the light-shielding layer contacts the first color filter and the first reflecting film overlaps a portion where the light-shielding layer contacts the first color filter.

5. An electronic apparatus comprising the liquid crystal display device according to claim 1.

6. A liquid crystal display device comprising:

an illumination device that outputs illumination light; and a liquid crystal panel that receives the illumination light from the illumination device, the liquid crystal panel including:

a pixel having a plurality of subpixels corresponding to different colors, each sub-pixel including a reflective portion and a transmissive portion;

a first substrate;

a second substrate disposed in between the first substrate and the illumination device, the second substrate being formed with a concave portion in a surface thereof that faces the illumination device, the concave portion extending continuously across the plurality of subpixels of the pixel;

liquid crystal interposed between the first and second substrates;

a first color filter corresponding to one of the subpixels, the first color filter being disposed within the concave portion in the second substrate;

a second color filter corresponding to another one of the subpixels, the second color filter being disposed within the concave portion in the second substrate with the first color filter; and a reflecting film provided in between the liquid crystal and the first and second color filters wherein no color filter is disposed between the first substrate and the reflecting film.

7. The liquid crystal display device according to claim 6, wherein the first color filter and the second color filter contact each other, the reflecting film overlapping a position where the first and second color filters contact each other.

* * * * *